(12) United States Patent
Pope

(10) Patent No.: US 7,236,515 B1
(45) Date of Patent: Jun. 26, 2007

(54) FORWARD LINK TIME DELAY FOR DISTRIBUTED ANTENNA SYSTEM

(75) Inventor: John Pope, London (GB)

(73) Assignee: Sprint Spectrum L.P., Overland Park, KS (US)

( * ) Notice: Subject to any disclaimer, the term of this patent is extended or adjusted under 35 U.S.C. 154(b) by 787 days.

(21) Appl. No.: 09/993,204

(22) Filed: Nov. 19, 2001

(51) Int. Cl.
*H04B 1/00* (2006.01)

(52) U.S. Cl. ............... 375/147; 375/347; 375/349; 455/13.3

(58) Field of Classification Search ............ 375/347, 375/147, 343, 148, 144; 370/509, 335; 455/13.3
See application file for complete search history.

(56) References Cited

U.S. PATENT DOCUMENTS

| | | | |
|---|---|---|---|
| 5,280,472 A * | 1/1994 | Gilhousen et al. | 370/335 |
| 5,551,064 A | 8/1996 | Nobbe et al. | |
| 5,577,265 A * | 11/1996 | Wheatley, III | 370/335 |
| 5,621,752 A * | 4/1997 | Antonio et al. | 375/144 |
| 5,654,979 A | 8/1997 | Levin et al. | |
| 5,757,767 A | 5/1998 | Zehavi | |
| 5,991,345 A * | 11/1999 | Ramasastry | 375/347 |
| 6,005,884 A | 12/1999 | Cook et al. | |
| 6,009,307 A * | 12/1999 | Granata et al. | 455/13.3 |
| 6,078,611 A * | 6/2000 | La Rosa et al. | 375/147 |
| 6,088,570 A | 7/2000 | Komara et al. | |
| 6,229,841 B1 * | 5/2001 | Levin et al. | 375/147 |
| 6,560,273 B1 * | 5/2003 | Sourour et al. | 375/148 |
| 6,563,858 B1 * | 5/2003 | Fakatselis et al. | 375/148 |
| 6,603,801 B1 * | 8/2003 | Andren et al. | 375/147 |
| 6,678,310 B1 * | 1/2004 | Andren et al. | 375/147 |
| 6,768,747 B1 * | 7/2004 | Dogan | 370/509 |
| 2002/0131479 A1* | 9/2002 | Butler et al. | 375/147 |
| 2002/0150182 A1* | 10/2002 | Dogan et al. | 375/343 |

* cited by examiner

*Primary Examiner*—Chieh M. Fan
*Assistant Examiner*—Sudhanshu C. Pathak

(57) ABSTRACT

An apparatus and method are shown for receiving multi-path signals. A rake receiver is used to receive multi-path signals. The rake receiver contains multiple fingers that act as correlators, where each finger is synchronized to one of the multi-path signals. Each finger of the rake receiver includes a variable delay element. The delay of the variable delay element in each finger may be determined by calculating the amount of time for a signal to travel from an antenna to the receiver, due to the path traveled, and setting the delay based on the measured travel time. The delay of the variable delay element in each finger may also be determined by scanning through a range of delays of the variable delay element and measuring an output signal level of the finger, the variable delay element then being set to the delay corresponding to the highest measured output signal level.

8 Claims, 6 Drawing Sheets

FORWARD LINK TIME DELAY FOR DISTRIBUTED ANTENNA SYSTEM

FIELD OF THE INVENTION

The present invention is directed to a method and system for improving air interface communications in a distributed antenna system.

BACKGROUND OF THE INVENTION

Wireless communication is an increasingly popular means of personal communication in the modern world. People are using wireless networks for the exchange of voice and data as an alternative to using a wire infrastructure. In principle, a user can seek information over the Internet or call anyone over a Public Switched Telephone Network (PSTN) from any place inside the coverage area of the wireless network.

With the increase of the popularity of wireless communications, many of the uses for a wire infrastructure are being replaced by wireless infrastructures. For example, a traditional wire infrastructure PBX may be replaced by a wireless PBX to route phone calls and Internet connections in an office. A wireless PBX may take advantage of wireless communication techniques.

A wireless communications technique commonly used to allow multiple users on the same channel is code division multiple access (CDMA). CDMA permits multiple users to use the same wireless communication channel at the same time, which allows the network infrastructure to support more wireless users. Some of the benefits of CDMA are improved call quality, simplified system planning through the use of the same frequency in every sector of every cell, enhanced privacy, improved coverage characteristics, increased talk time for portables, and increased bandwidth.

CDMA utilizes the radio spectrum by allowing multiple users to share the same physical channel. In CDMA, multiple users occupy the same frequency at the same time. Consequently, frequency and time are not used to discriminate between users. Instead, CDMA separates multiple users using the same channel through the use of codes. The receiver in the CDMA system typically receives a waveform that consists of a mixture of signals from several users. The system then uses coding to discriminate between the signals received from the multiple users on the same frequency channel at the same time.

CDMA is a type of spread spectrum communication technique known as Direct Sequence Spread Spectrum (DSSS). In this approach, a narrowband data signal from a user is spread through the use of a broadband code that is unique to the user in order to create a broadband signal for transmission. The broadband signal is then transmitted on a frequency that may also be used by other users. When a receiver receives the broadband signal, it uses the user's unique code to recover the user's narrowband data signal from the mixture of signals encountered by the receiver.

In CDMA, each bit of the user's narrowband signal is divided into a number "m" of short intervals called chips. Each bit is typically broken down into from 64 to 128 chips. Each transmitting user is assigned a unique chip pattern or sequence that is, in effect, that user's code channel. Using this unique sequence, the user's transmitted signal will be distinguishable by a receiver from other signals using the same physical channel. Other user's code patterns will appear random to the receiver and will integrate in a random self-canceling fashion such that they do no disturb the bit decoding decision being made with the selected user's code pattern.

Since each bit is represented by "m" chips, the information to be transmitted is increased from "b" bits to "mb" chips per second. This takes advantage of the high bandwidth in a CDMA system. Each chip may be represented by a complex number in Euclidean signal space. The real, or in-phase, component of a signal is modulated by a sine wave and transmitted at the operating frequency. The imaginary, or quadrature, component of the signal is transmitted with a 90° phase shift of the same wave.

A typical receiver used in CDMA receives multiple versions of the same signal, each version having a different delay. The multiple versions, or multi-path signals, may arise, for example through multiple paths due to reflections or from multiple transmitters. It may be difficult for the receiver to resolve a desired signal from apparent stronger signals received. One way to capitalize on this apparent disadvantage is to use a rake receiver. A rake receiver combines the multi-path signals with the main signal in order to increase the strength of the main received signal instead of degrading it.

The rake receiver attempts to gather as much signal power as possible by identifying the multi-path replicas of the transmitted signal and assigning separate correlators to each of them. These correlators are commonly referred to as the rake "fingers" and a rake receiver typically has three fingers. For each frame of received data signals, the receiver uses the combined output of the three rake fingers. Each finger may be configured to independently recover a particular code. However, the fingers may also be targeted on delayed multi-path reflections or on different transmitter stations.

A rake receiver captures the different time arrivals of a desired signal separately by exploiting the correlation properties of the spreading code used in a CDMA system. Typically, a rake receiver may be able to resolve signals that are at least ⅛ chip apart from each other. The signals that correspond to ⅛ chip apart from each other have been received 80 milliseconds apart from each other. To exploit the multi-path resolution possibilities via a rake receiver, the delay spread of incoming signals should be greater than the chip rate used in transmission. Therefore, conventionally, the fingers of a rake receiver are equally spaced from one another by ⅛ chip. In other words, each finger is delayed by 80 milliseconds from the adjacent finger.

In a CDMA distributed antenna system, a number of antenna elements at different locations may simultaneously communicate on the same frequency and same channel (e.g., same Pseudonoise (PN) Offset and same Walsh code) with a given mobile station. A Walsh code contains 64 sequences, each 64 chips long. Each Walsh code is orthogonal to all other Walsh codes. A Walsh code's orthogonal nature prevents one code from interfering with other Walsh codes. A common base transceiver station (BTS) may power the group of antennas used in the CDMA system. On both the forward link (communications from the base station to the mobile station) and reverse link (communications from the mobile station to the base stations), the physical separation of the antenna elements can give rise to phase differences and consequent signal distortion (e.g., cancellation, etc.).

With an existing distributed antenna system, the signals may get offset in phase by the time the signals reach the MS (mobile station). This may cause multiple problems. The orthogonal nature of the Walsh codes is lost when they are not time aligned. As a result, a loss of time alignment can cause interference among the various forward link traffic channels. Interference problems can also occur when there is a phase misalignment between the transmitted pilot and other Walsh channels. Interference may hinder the possibility of successfully receiving the transmitted signal.

A CDMA forward link system uses separate and distant in phase (I) and quadrature (Q) pseudorandom-noise (PN) spreading sequences. Any phase misalignment between the receiver and its incoming Walsh channel results in interference between the spreading sequences. Phase errors are essentially a loss of orthogonality between I and Q. These phase errors can result from crosstalk between I and Q in the base station baseband processing section, misaligned local oscillators, intermodulation (IM) between Walsh codes, or signal distortion due to the physical separation of the transmitting antenna elements.

SUMMARY OF THE INVENTION

The present invention relates to a method and apparatus for optimizing the combined signal strength obtained using a rake receiver. In the present invention, a variable delay element is provided for rake receiver finger for the purpose of offsetting the receiving times of each signal sent and received by a rake receiver. The delay of each variable delay element is calibrated to a multi-path signal or a signal transmitted from an antenna in a CDMA distributed antenna system.

An embodiment of a rake receiver circuit, according to the present invention, for receiving multi-path signals, includes a first rake finger circuit having a first variable delay element, where the first variable delay element is configured to receive a first delay control signal, the first delay control signal value being selected to align a first delay introduced by the first variable delay element with a first multi-path signal to produce a first correlated data signal. The receiver circuit also includes a second rake finger circuit having a second variable delay element, where the second variable delay element is configured to receive a second delay control signal, the second delay control signal value being selected to align a second delay introduced by the second variable delay element with a second multi-path signal to produce a second correlated data signal. Finally, the receiver circuit includes a summing circuit for summing the first and second correlated signals to produce a combined data signal.

An embodiment of a system, according to the present invention, for transmitting multi-path signals to a rake receiver, includes a plurality of antennae, where each antenna is configured to transmit a multi-path signal. The system also includes a plurality of variable delay elements, each variable delay element coupled to a corresponding one of the plurality of antennae, where the delay of each variable delay element is selected such that the multi-path signal of corresponding antenna is aligned with one finger of the rake receiver.

An embodiment of a method, according to the present invention, for receiving a plurality of multi-path signals in a rake receiver, includes providing a first variable delay for a first finger of the rake receiver and selecting a delay of the first variable delay to correspond to a first one of the plurality of multi-path signals. The method also calls for providing a second variable delay for a second finger of the rake receiver and selecting a delay of the second variable delay to correspond to a second one of the plurality of multi-path signals. The method also sets forth summing outputs of the first and second fingers of the rake receiver.

According to one aspect of the invention, a separate delay element may be provided for each signal transmitted from an antenna element, so as to deliver each air interface link with a time delay sufficient to allow a rake receiver to resolve the signals. Typically, a rake receiver will be able to resolve signals that are at least ⅛ chip apart from each other. The exemplary embodiment may therefore offset the receiving times of signals substantially more than ⅛ chip and synchronize the receiver with the transmitting antenna to trivialize the inherent phase differences between the various antenna elements.

In one embodiment, the delay element may be implemented within the rake receiver. The delay element of the rake receiver may be set to a pre-determined amount based on a calculated amount of delay to account for spatial delays from the spacing between transmitting antenna elements. The fingers of a rake receiver may be tuned to a calculated delay in order to receive the transmitted signals at an optimal time. The transmission time of a signal may be calculated according to distance and path from the transmitting antenna to the rake receiver. Each associated rake receiver finger may be set to a different time delay corresponding to a distinct delay for a transmitting antenna. Thus, the incoming signals may be delayed to match the rake receiver fingers spacing.

In another embodiment, the rake receiver may take advantage of multi-path signaling due to the adjusted time delays. An antenna system may be used to transmit signals to the rake receiver. Each finger of the rake receiver may be tuned to an antenna of the system according to the transmission time of the signal from the antenna. This may allow for the rake receiver fingers to be optimally set to receive an optimal signal containing a sufficient amount of power.

In yet another embodiment, a time delay element may be implemented within the transmitting antennas of an antenna system. A corresponding delay due to the path and distance that a signal may travel may be pre-calculated and set in the transmitting antennas. The antennas of an antenna system may transmit signals at times according to the calculated delays. All of the antennas in the antenna system may transmit the same signal and the rake receiver fingers may individually be tuned to a separate antenna in order to take advantage of multi-path signaling. The rake receiver may potentially receive many reliable signals from each antenna. The rake receiver may be optimally receiving each signal transmitted from each antenna in the antenna system.

In still another embodiment, the time delay element may be adjusted in real-time. The time delay elements of each finger of the rake receiver may be adjusted after receiving a signal in order to receive signals at the most optimal time. The time delay may be automatically calculated periodically and reset according to the calculations. This may take into account any distance or path change that the signal may take. In another embodiment, the time delay may be manually calculated and reset periodically in order to take into account any signal path modifications as mentioned earlier.

In yet still another embodiment, the signals received by a rake receiver may be delayed to maximize the input power of the signals. The signals may be delayed to match and correspond to the rake receiver fingers. A tuned delay may be implemented that may be manually or automatically adjustable.

The invention may thereby allow for an optimal and efficient use of rake receivers. It is therefore desirable to configure a mobile communications network to provide a time delay component for each signal to be transmitted to a rake receiver. The present invention provides a mechanism for take advantage of multi-path signaling.

These as well as other features and advantages of the present invention will become apparent to those of ordinary skill in the art by reading the following detailed description, with appropriate reference to the accompanying drawings.

DESCRIPTION OF FIGURES

An exemplary embodiment of the present invention is described herein with reference to the drawings, in which.

DETAILED DESCRIPTION OF AN EXEMPLARY EMBODIMENT

The present invention relates to a method and apparatus for optimizing the combined signal strength obtained using a rake receiver. In the present invention, a variable delay element is provided for rake receiver finger for the purpose of offsetting the receiving times of each signal sent and received by a rake receiver. The delay of each variable delay element is calibrated to a signal transmitted from an antenna in a CDMA distributed antenna system.

Figure 1:
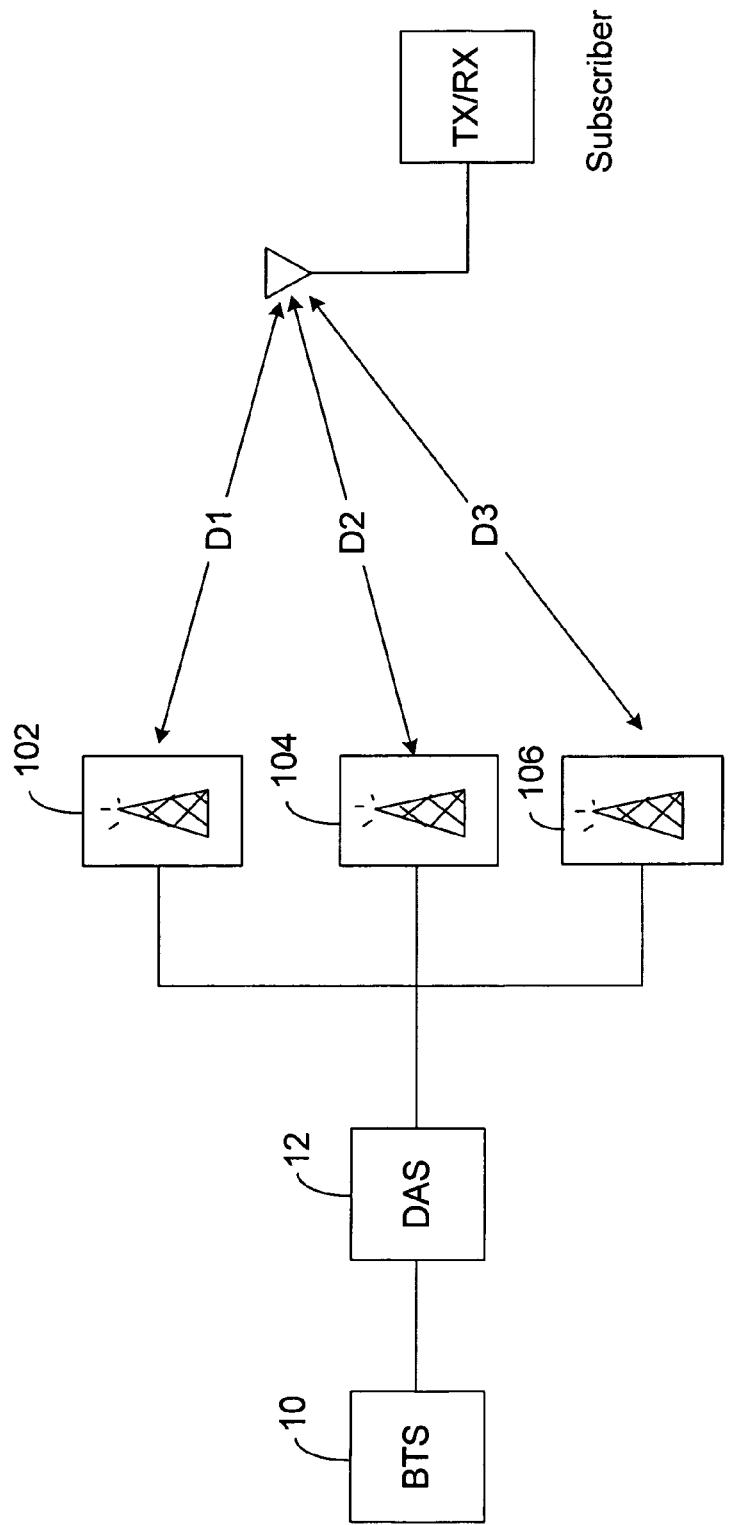
FIG. 1 is a wireless system arranged to operate in accordance with an exemplary embodiment of the present invention.

Referring to FIG. 1, an example of a wireless system is shown that is suitable for application of the present invention. In FIG. 1, an antenna system is shown that includes a first antenna 102, a second antenna 104, and a third antenna 106 that may be used for transmitting signals to a stationary receiver 108. The signals from antennae 102, 104 and 106 are transmitted across an air interface to receiver 108. A receiver 108 is used to receive the transmitted signals. The rake receiver 108 includes an antenna 110 for receiving the transmitted signals. In this example, antennae 102, 104 and 106 are located at distances D1, D2 and D3, respectively, from receiver 108, which results in a multi-path delay of each of the signals transmitted by the antennae when the signals arrive at receiver 108.

Figure 2:
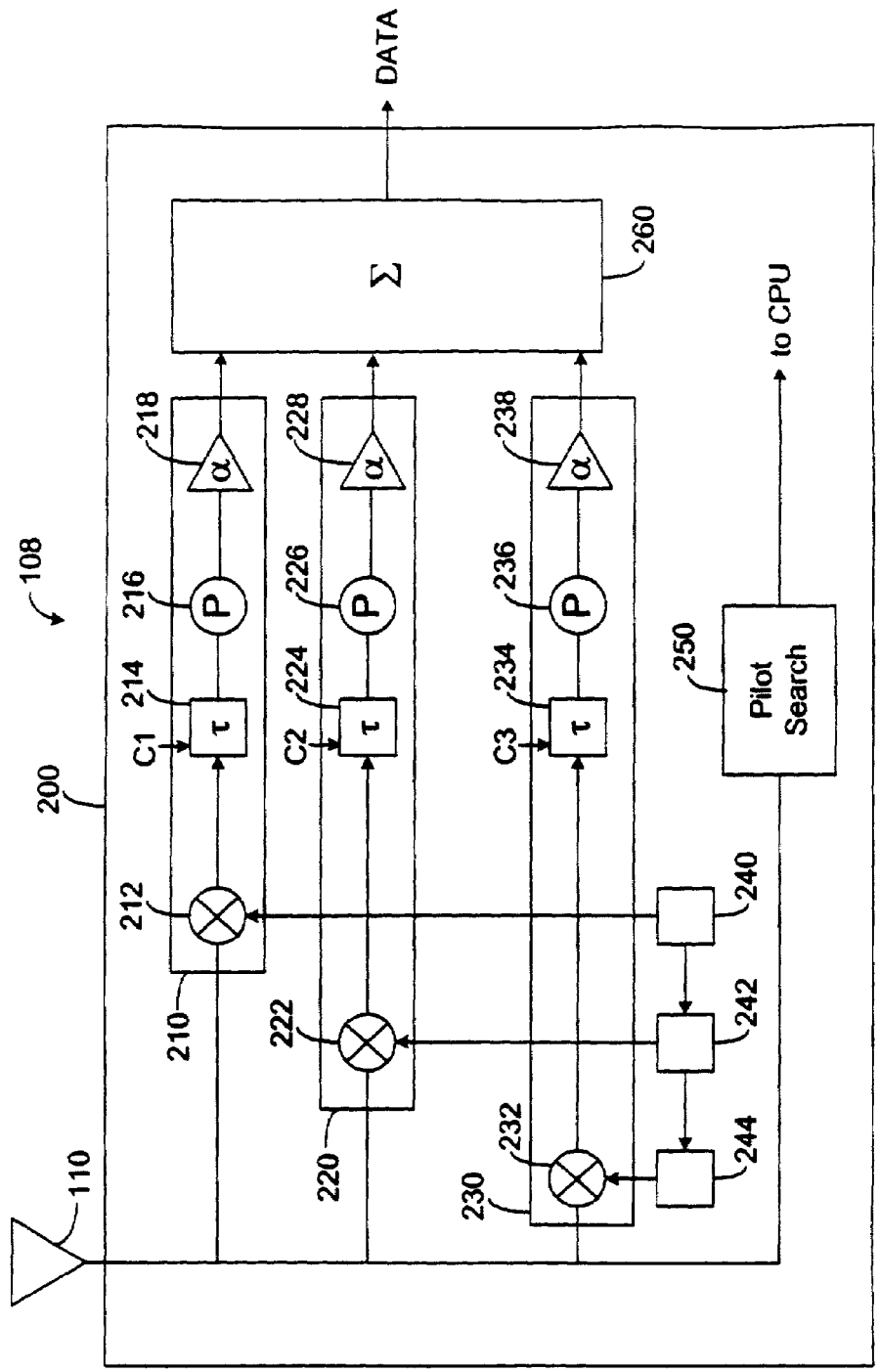
FIG. 2 is a detailed block diagram of FIG. 1 arranged to operate in accordance with an exemplary embodiment of the present invention.

FIG. 2 is a functional block diagram of one embodiment of receiver 108 of FIG. 1, according to the present invention. In FIG. 2, receiver 108 includes a rake receiver 200 having three receiver fingers 210, 220 and 230. Receiver finger 210 includes a multiplier 212, in series with a variable delay element 214, a phase adjuster 216, and an equalizer 218. Likewise, receiver finger 220 is composed of multiplier 222, variable delay element 224, phase adjuster 226 and equalizer 228 coupled in series. Similarly, receiver finger 230 is composed of multiplier 232, variable delay element 234, phase adjuster 236 and equalizer 238 coupled in series. Each finger of a rake receiver 108 may be thought of as a correlator to individually process several signal multi-path components.

A series of PN code generators 240, 242 and 244 is provided to generate pseudo-random PN codes for input to each of the receiver fingers 210, 220 and 230 to allow decoding of a signal encoded using a PN code. A summer 260 sums the output of each of the rake fingers 210, 220 and 230 to produce a received data signal and improve the reliability of the communications path.

The rake receiver 108 de-spreads the received signals, and recombines them to obtain the desired signal. In the de-spreading process, the signals are separated by calculating the correlation. The fingers 200 of a rake receiver 108 are the combination of a cross correlator and a code generator, with delays provided by delay elements 214, 224 and 234 and codes provided by PN code generators 240, 242 and 244. The circuitry for each finger is used for extracting one specific delay of a desired signal. Mobile receivers typically combine the output of three rake receiver fingers coherently (outputs are added in voltage) that are separated by ⅛ of a chip.

The rake receiver 108 searches for pilot signals to locate signals for communications channels. A pilot is a "structural beacon" which does not contain a character stream. It is a timing source used in system acquisition and as a measurement device used in signal making decisions. Pilot search circuit 250 continuously searches for pilot signals received by receiver 108. Pilot searcher 250 continuously checks pilots of incoming signals to ensure that a signal with a sufficient amount of power is selected for the communications channel. The receiving station may assign different sectors according to pilots received corresponding to different antennas. Each antenna may have a distinct pilot used to distinguish signals that the antenna may transmit.

The pilot search circuit 250 signals a central processing unit that controls receiver 108 to indicate the pilot signals that have been observed. The CPU, or other controller device, that controls receiver 108 then controls the frequency assigned to each of fingers 210, 220 and 230 and the PN codes generated by PN generators 240, 242 and 244. The active pilot used by the receiver may indicate the sectors or antennas in use. The pilot search circuit 250 locates candidate pilots which may be pilots that have moderate signal power. The pilot search circuit 250 may also send a Pilot Strength Measurement Message to the system whenever it notices a pilot in a neighboring or remaining sector that exceeds the active signal power, an active pilot drops below a desired signal power, or a candidate pilot exceeds an active pilot signal power.

Multiplier 212 of finger 210 has two input terminals, a first input terminal coupled to receive antenna 110 for receiving a first multi-path signal and a second input terminal for receiving a PN code from PN generator 240. Multiplier 212 multiplies the PN code provided by PN generator 240 with the first multi-path signal to generate a first decoded signal at an output terminal of multiplier 212. The output terminal of multiplier 212 is coupled to an input terminal of variable delay element 214. Variable delay element 214 delays the first decoded data signal under control of a delay control signal C1 to produce a first delayed decoded data signal that is generated at an output terminal of variable delay element 214. The output terminal of variable delay element 214 is coupled to an input terminal of phase adjuster 216 that adjusts the phase of the first delayed decoded data signal to produce a first phase adjusted data signal at an output terminal of phase adjuster 216. The output terminal of phase adjuster 216 is coupled to an input terminal of equalizer 218, which equalizes the first phase adjusted data signal to produce a first correlated data signal for input to a first input terminal of summer 260.

Likewise, multiplier 222 of finger 220 has two input terminals, a first input terminal coupled to receive antenna 110 for receiving a second multi-path signal and a second input terminal for receiving a PN code from PN generator 242. Multiplier 222 multiplies the PN code provided by PN generator 242 with the second multi-path signal to generate a second decoded signal at an output terminal of multiplier 222. The output terminal of multiplier 222 is coupled to an input terminal of variable delay element 224. Variable delay element 224 delays the second decoded data signal under control of a delay control signal C2 to produce a second delayed decoded data signal that is generated at an output terminal of variable delay element 224. The output terminal of variable delay element 224 is coupled to an input terminal of phase adjuster 226 that adjusts the phase of the second delayed decoded data signal to produce a second phase adjusted data signal at an output terminal of phase adjuster 226. The output terminal of phase adjuster 226 is coupled to an input terminal of equalizer 228, which equalizes the second phase adjusted data signal to produce a second correlated data signal for input to a second input terminal of summer 260.

Similarly, multiplier 232 of finger 230 has two input terminals, a first input terminal coupled to receive antenna 110 for receiving a third multi-path signal and a second input terminal for receiving a PN code from PN generator 244. Multiplier 232 multiplies the PN code provided by PN generator 244 with the third multi-path signal to generate a third decoded signal at an output terminal of multiplier 232. The output terminal of multiplier 232 is coupled to an input terminal of variable delay element 234. Variable delay element 234 delays the third decoded data signal under control of a delay control signal C3 to produce a third delayed decoded data signal that is generated at an output terminal of variable delay element 234. The output terminal of variable delay element 234 is coupled to an input terminal of phase adjuster 236 that adjusts the phase of the third delayed decoded data signal to produce a third phase adjusted data signal at an output terminal of phase adjuster 236. The output terminal of phase adjuster 236 is coupled to an input terminal of equalizer 238, which equalizes the third phase adjusted data signal to produce a third correlated data signal for input to a third input terminal of summer 260. Summer 260 sums the first, second and third correlated data signals to form a received data signal DATA.

Figure 3:
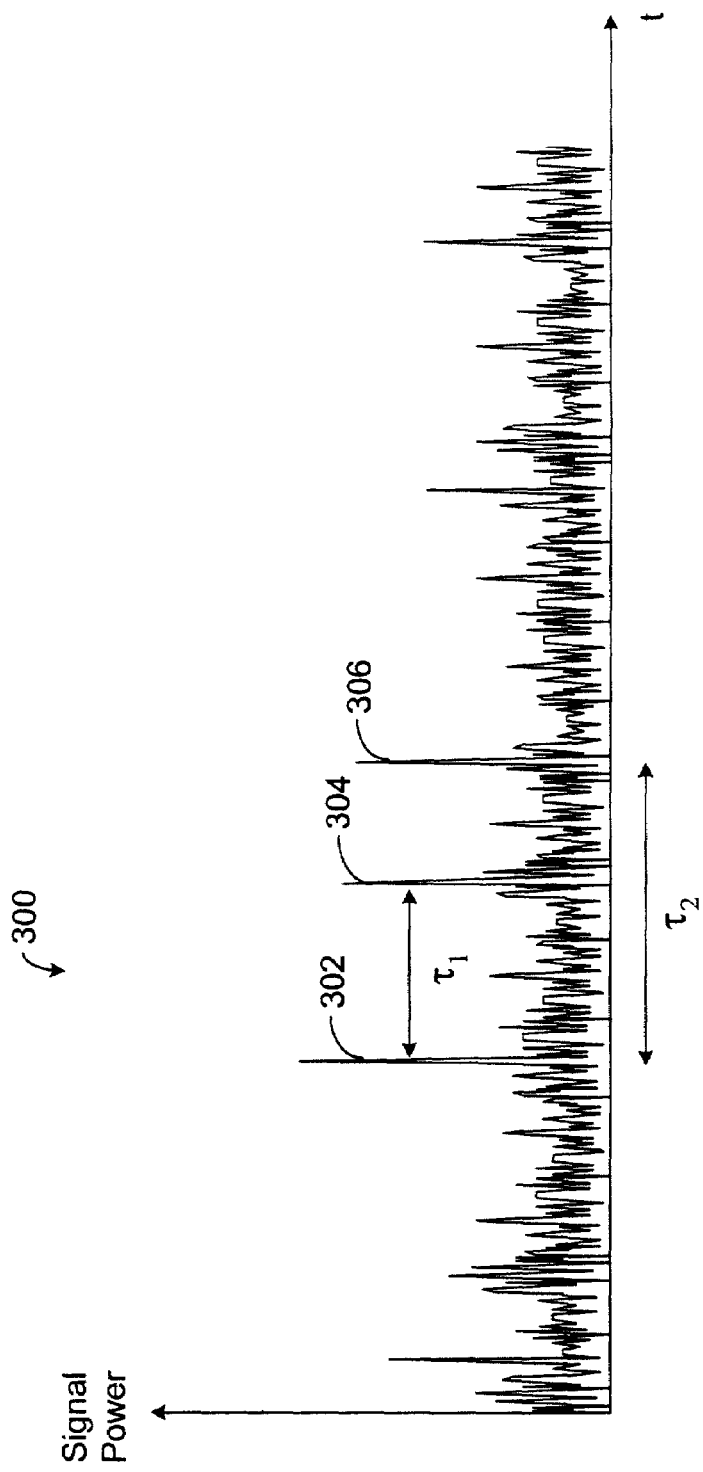
FIG. 3 is a wireless system of FIG. 2 with an incoming signal is shown arranged to operate in accordance with an exemplary embodiment of the present invention.

FIG. 3 is a waveform diagram illustrating an example of a series of multi-path signals 302, 304 and 306 received at antenna 110 of receiver 108. In the diagram of FIG. 3, multi-path signals 302, 304 and 306 are separated in time from one another. Also note that signal 304 is delayed relative to signal 302 by a first delay $\tau_1$ and signal 306 is delayed relative to signal 302 by a second delay $\tau_2$. Delays $\tau_1$ and $\tau_2$ result, for example, from the difference in the distance between receiver 108 and antennae 102, 104 and 106 shown in FIG. 1. By way of further example, assume that antenna 102 is closest to receiver 108 and corresponds to multi-path signal 302, antenna 104 is farther from receiver 108 than antenna 102 and corresponds to multi-path signal 304, and antenna 106 is farthest from receiver 108 and corresponds to multi-path signal 308.

Note that, in the example of FIG. 3, multi-path signals 302, 304 and 306 are not evenly spaced from one another in time. Also note that the multi-path signals 302, 304 and 306 are not separated by 80 milliseconds. Consequently, a conventional rake receiver having its fingers equally spaced at 80 millisecond delay intervals will not be aligned with the multi-path signals 302, 304 and 306.

In the receiver according to the present invention, rake fingers 210, 220 and 230 are aligned of FIG. 2 are aligned with multi-path signals 302, 304 and 306 in order to optimize the strength of the combined signal obtained by summer 260. In receiver 108, control signals C1, C2 and C3 are varied in order to adjust variable delay elements 214, 224 and 234 for rake fingers 210, 220 and 230, respectively. Control signals C1, C2 and C3 are adjusted so that each rake finger 210, 220 and 230, respectively, receives a corresponding multi-path signal 302, 304 and 306, respectively, and delays the corresponding multi-path signal such that the multi-path signals arrive at the same time at summer 260. In other words, multi-path signals 302, 304 and 306 are correlated with one another after having passed through their corresponding rake finger 210, 220 and 230. This results in higher combined signal strength at summer 260.

In one embodiment of the present invention, control signals C1, C2 and C3 are determined when receiver 108 is installed and placed into service. For example, a technician using test equipment may scan for the multi-path signals 302, 304 and 306 once receiver 108 is installed and adjust control signals C1, C2 and C3 accordingly. Similarly, the technician may adjust control signals C1, C2 and C3 based upon distances D1, D2 and D3 of receiver 108 to the transmit antennae 102, 104 and 106, respectively, as shown in FIG. 1.

Figure 4:
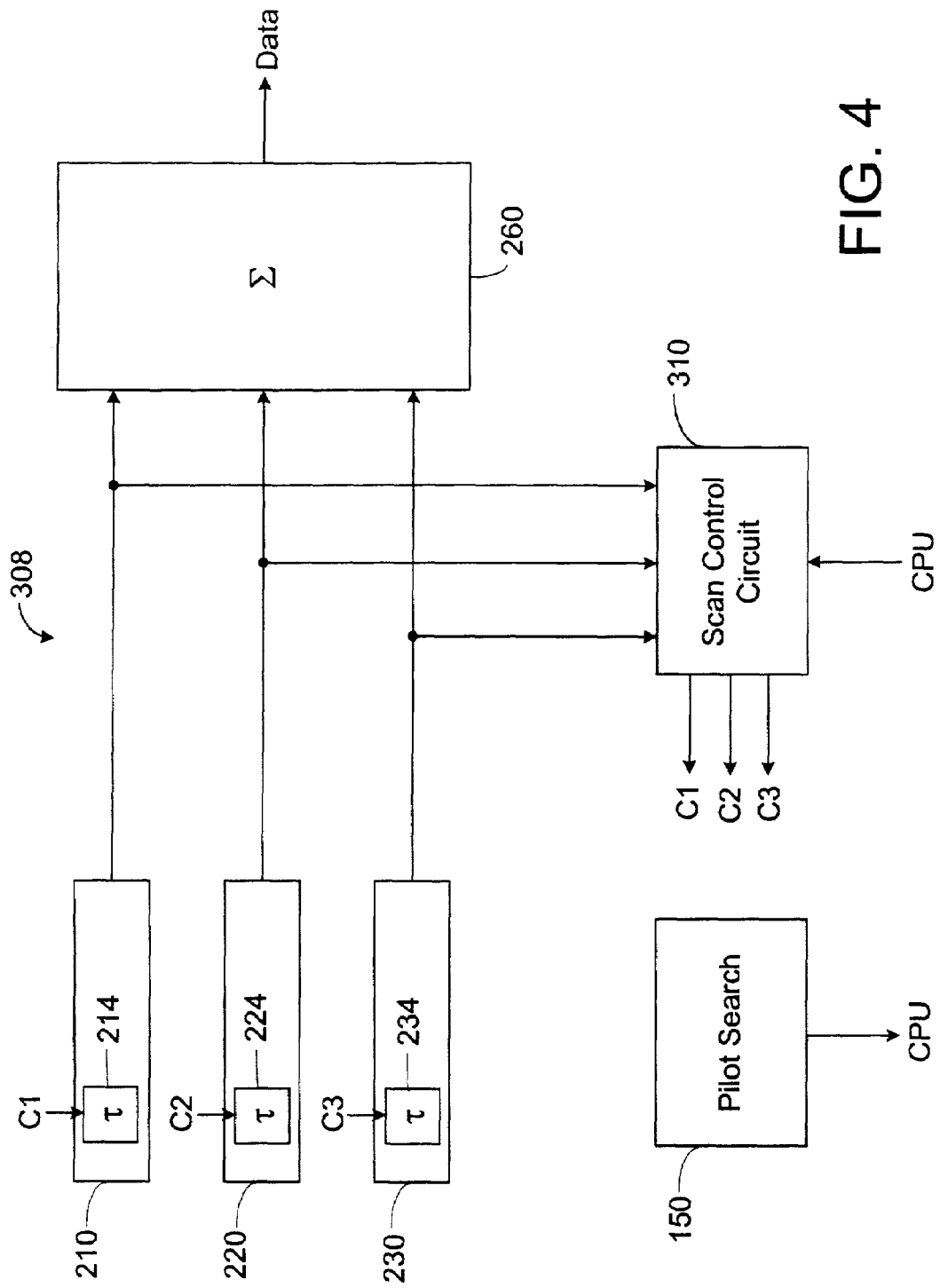
FIG. 4 is an alternative wireless system arranged to operate in accordance with an exemplary embodiment of the present invention.

FIG. 4 is a functional block diagram illustrating another embodiment of a receiver 308 according to the present invention. In receiver 308, a scan control circuit 310 is included that is configured to monitor the signal level output from each of the rake receiver fingers 210, 220 and 230 and generate the corresponding delay control signals C1, C2 and C3. A CPU or other controller for receiver 308 inputs a scan signal that triggers scan control circuit 310 to scan and set the control signals C1, C2 and C3. Responsive to the scan signal, circuit 310 will scan through the range of delay for each rake receiver finger 210, 220 and 230 and measure the signal strength to determine the delay value that results in the strongest signal output from the corresponding finger.

Figure 5:
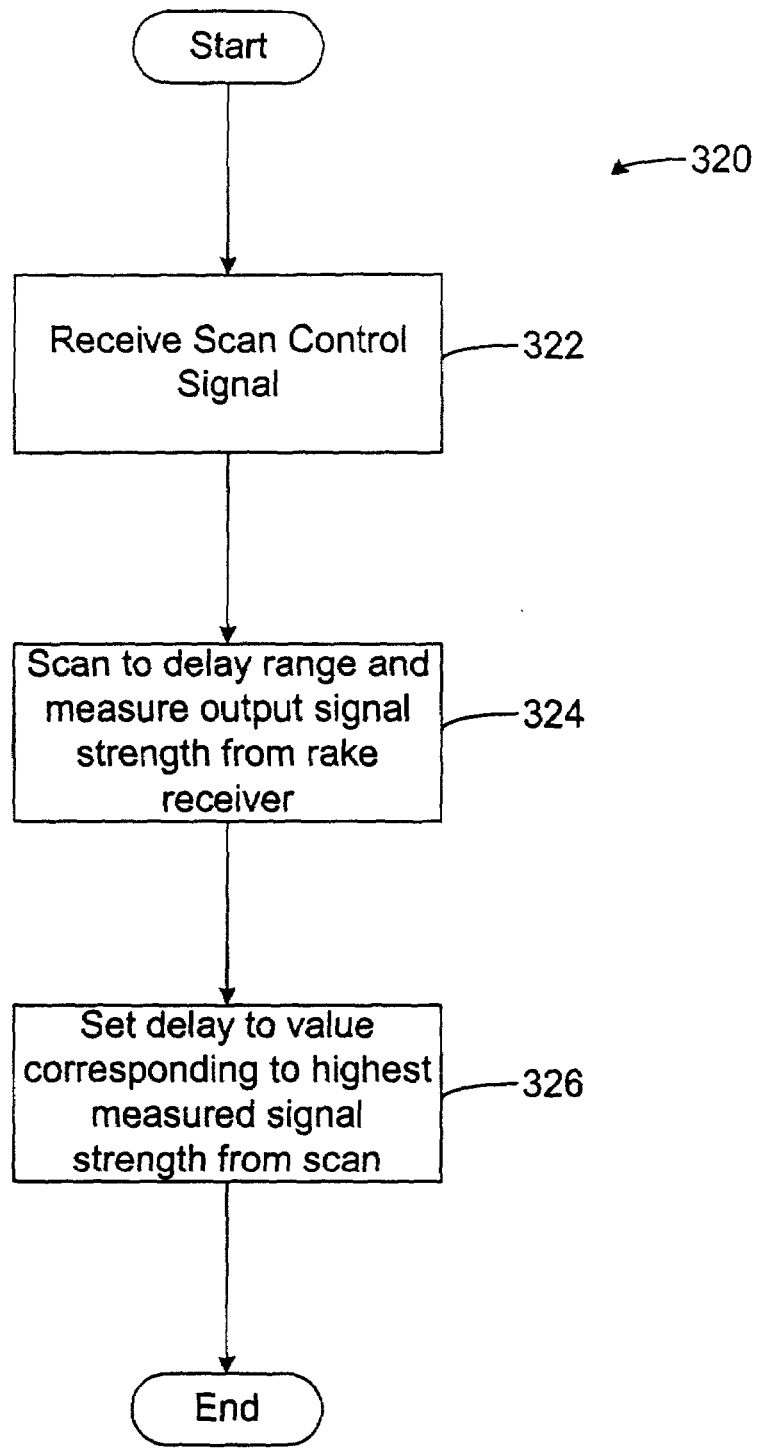
FIG. 5 is a flowchart depicting functional blocks of an exemplary embodiment of the present invention.

FIG. 5 is a control flow diagram illustrating an embodiment of the scan function 320 performed by circuit 310 for each control signal C1, C2 and C3. Scan function 320 is entered responsive to the scan signal provided by the CPU or other controller for receiver 308, as indicated at step 322. The scan signal may be generated, for example, at power-up, at predetermined time intervals, or in response to certain system events, such as initiation of communication or sensing of an idle state. Scan control circuit 310 then scans, at step 324, through the delay range for the rake finger and measures the signal strength output by the rake finger for each value of the control signal that is output by the circuit. For rake finger 210, circuit 310 may start with the minimum value of C1 corresponding, for example, to 0 milliseconds delay and slowly increase the value of C1 to the maximum value of C1 corresponding, for example, to 80 milliseconds. For rake finger 220, circuit 310 may start with the minimum value of C2 corresponding, for example, to 80 milliseconds delay and slowly increase the value of C2 to the maximum value of C2 corresponding, for example, to 160 milliseconds. Likewise, for rake finger 230, circuit 310 may start with the minimum value of C3 corresponding, for example, to 160 milliseconds delay and slowly increase the value of C3 to the maximum value of C3 corresponding, for example, to 240 milliseconds.

Using the received signal example of FIG. 3, the output signal strength of rake finger 210 will be at its maximum when the value of C1 aligns the delay of the rake finger with multi-path signal 302 and this value is stored by circuit 310. Scan control circuit 310 will then set the value of C1 to the stored value corresponding to signal 302 at step 326 of FIG. 5. Similarly, the output signal strength of rake finger 220 will be at its maximum when the value of C2 aligns the delay of the rake finger with multi-path signal 304 and this value is stored by circuit 310 for use in step 326 for setting the operational value of C2. Likewise, the output signal strength of rake finger 230 will be at its maximum when the value of C3 aligns the delay of the rake finger with multi-path signal 306 and this value is stored by circuit 310 for use in step 326 for setting the operational value of C2. Once process 320 has been performed for each rake finger, receiver 308 is optimized for receiving data from antennae 102, 104 and 106.

Figure 6:
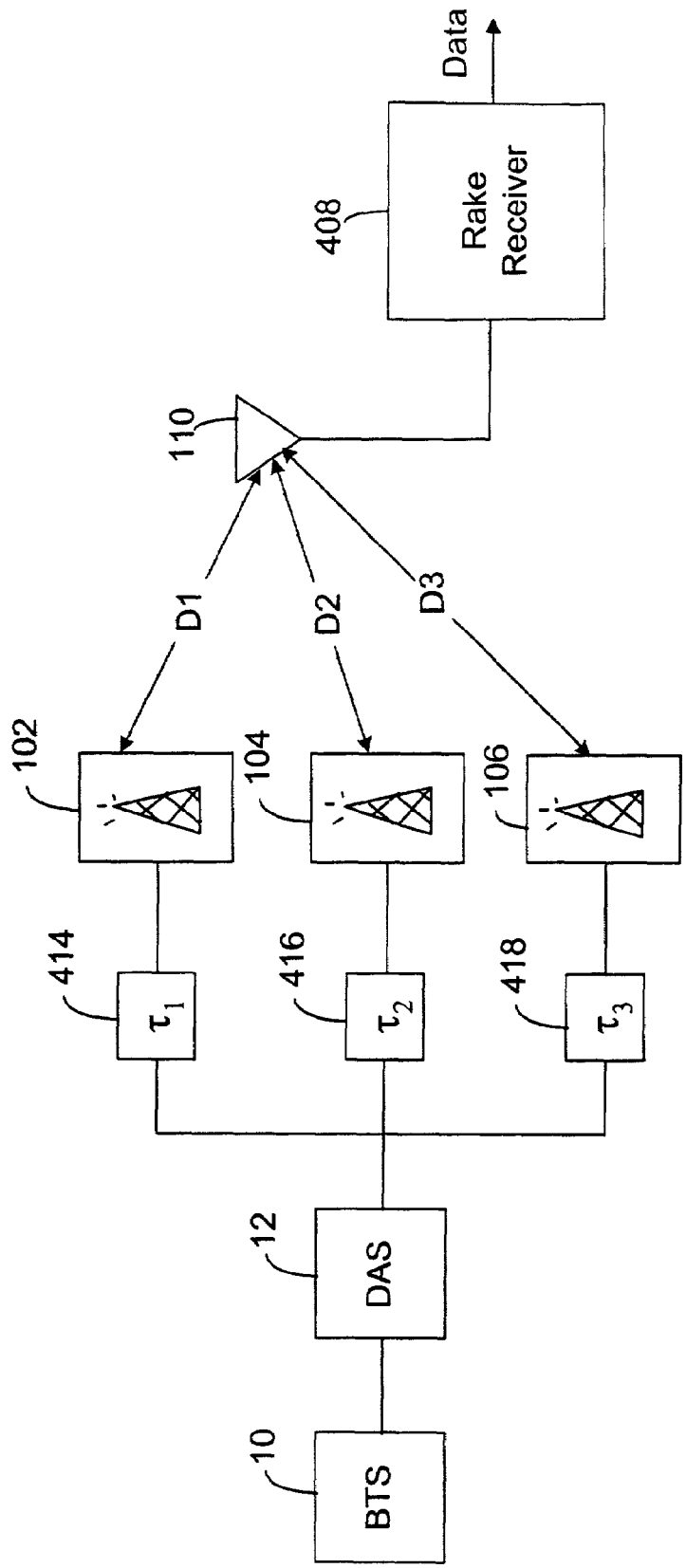
FIG. 6 is a functional block diagram illustrating another embodiment of the present invention having time delay elements coupled to transmit antennae.

In yet another embodiment of the present invention, a time delay element may be implemented in combination with the transmitting antennas of the antenna system shown in FIG. 1. Referring to FIG. 6, an example of an alternative embodiment of the present invention in accordance with this aspect of the present invention is shown. In FIG. 6, a base transmitter station (BTS) 10 sends a signal to be transmitted to a distributed antenna system circuit (DAS) 12 that distributes the transmission signal to first 102, second 104, and third 106 antenna through a corresponding delay element 414, 416 and 418, respectively. Each of the antennae 102, 104 and 106 is located at an effective distance D1, D2 and D3, respectively, to receiver antenna 110.

In one embodiment of the present invention, a corresponding delay due to the effective path distance D1, D2 and D3 that a signal must travel to receive antenna 110 is pre-calculated and set in the delay elements 414, 416 and 418 for transmitting antennae 102, 104 and 106, respectively. In this embodiment, the fingers of rake receiver 408 are separated by 1/8 of a chip, as is typical of mobile receiver. The delays pre-calculated for delay elements 414, 416 and 418 are therefore determined such that the signals from antennae 102, 104 and 106 arrive at receive antenna 110 and 1/8 chip intervals, such that the received signal from each antenna is aligned with a corresponding finger of rake receiver 408.

All of the antennas in the antenna system may transmit the same signal and the rake receiver fingers may individually be tuned to a separate antenna in order to take advantage of multi-path signaling. The rake receiver 108 may potentially receive many reliable signals from each antenna. The rake receiver 108 may be optimally receiving each signal transmitted from each antenna in the antenna system.

In another embodiment, the delay of time delay elements 414, 416 and 418, may be adjusted in real-time. For example, the delays of elements 414, 416 and 418 may be adjusted based on a return control signal from receiver 408 indicating the necessary adjustment to correlate the delay for the signal from each of each antenna 102, 104 and 106 to maximize the signal strength received by each finger of the rake receiver 408. The time delay may be automatically calculated periodically and reset according to the calculations. This may take into account any distance or path changes that the signal may take.

In one embodiment, the antenna system and rake receivers 108 and 408 are stationary. This allows the time delay to be calculated and limits the need for adjustment. In another embodiment, the time delay may be manually calculated and reset periodically in order to take into account any signal path changes. In yet another embodiment, the delays are automatically calculated from time to time or in response to events or signal conditions.

In one aspect of the present invention, signals received by a rake receiver may be selectively delayed to maximize the input power of the multi-path signals received at the receiver. The signals may be delayed to match and correspond to the rake receiver fingers. The delay values may be manually or automatically adjustable.

Certain exemplary embodiments of the present invention have been illustrated and described above. It will be understood by one of ordinary skill in the art, however, that changes and modifications may be made to the embodiments shown without departing from the scope of the invention, as defined by the following claims. Further, the claims should not be read as limited to the described order of elements unless stated to that effect. Therefore, all embodiments that come within the scope and spirit of the following claims and equivalents thereto are claimed as the invention.

I claim:

1. A rake receiver circuit for receiving multi-path signals, the rake receiver comprising:
    a first rake finger circuit having a first variable delay element, where the first variable delay element is configured to receive a first delay control signal, the first delay control signal value being selected to align a first delay introduced by the first variable delay element with a first multi-path signal to produce a first correlated data signal;
    a second rake finger circuit having a second variable delay element, where the second variable delay element is configured to receive a second delay control signal, the second delay control signal value being selected to align a second delay introduced by the second variable delay element with a second multi-path signal to produce a second correlated data signal;
    a scan control circuit configured to receive the first and second correlated signals and, responsive thereto, generate the first and second delay control signals, where the scan control circuit is configured to generate the first delay control signal by: (i) varying the first delay control signal over a first predetermined range of values, (ii) measuring a signal power level of the first correlated data signal to determine a value of the first delay control signal corresponding to a highest measured signal power level of the first correlated data signal, and (iii) setting the first delay control signal to the value of the first delay control signal corresponding to the highest measured signal power level of the first correlated data signal for operation, and where the scan control circuit is further configured to generate the second delay control signal by: (i) varying the second delay control signal over a second predetermined range of values, (ii) measuring a signal power level of the second correlated data signal to determine a value of the second delay control signal corresponding to a highest measured signal power level of the second correlated data signal, and (iii) setting the second delay control signal to the value of the second delay control signal corresponding to the highest measured signal power level of the second correlated data signal for operation; and
    a summing circuit for summing the first and second correlated signals to produce a combined data signal.

2. The rake receiver of claim 1, where the scan control circuit is further configured to generate the first and second delay control signals responsive to a scan control signal.

3. The rake receiver of claim 1, wherein the first delay and the second delay are selected so that the first correlated data signal and the second correlated data signal arrive at the summing circuit at substantially the same time.

4. The rake receiver of claim 1, wherein the scan control circuit is configured to generate the first delay control signal by varying the first delay control signal over the first predetermined range of values, wherein the first predetermined range of values approximately corresponds to an amount of time for the first multi-path signal to travel to the rake receiver.

5. The rake receiver of claim 1, wherein the first rake finger circuit includes a multiplier in series with a variable delay element and a phase adjuster.

6. The rake receiver of claim 5, wherein the multiplier multiplies a PN code with the first multi-path signal to generate a first decoded signal.

7. The rake receiver of claim 6, wherein the variable delay element delays the first decoded signal according to the first delay control signal to produce a first delayed decoded signal.

8. The rake receiver of claim 7, wherein the phase adjuster adjusts the phase of the first delayed decoded signal.

* * * * *